United States Patent [19]
Umeda et al.

[11] Patent Number: 5,548,682
[45] Date of Patent: Aug. 20, 1996

[54] METHOD OF AUTOMATICALLY CREATING CONTROL SEQUENCE SOFTWARE AND APPARATUS THEREFOR

[75] Inventors: Yasushi Umeda, Tama; Tetsuo Tomiyama, Tokyo; Hiroyuki Yoshikawa, Tokyo; Tomohiko Sakao, Tokyo; Yoshiki Shimomura; Sadao Tanigawa, both of Osaka, all of Japan

[73] Assignee: Mita Industrial Co., Ltd., Osaka, Japan

[21] Appl. No.: 194,064

[22] Filed: Feb. 9, 1994

[30] Foreign Application Priority Data

Feb. 16, 1993 [JP] Japan ................ 5-026910

[51] Int. Cl.⁶ .................................. G06F 15/00
[52] U.S. Cl. .................................. 395/10
[58] Field of Search .................................. 395/10

[56] References Cited

U.S. PATENT DOCUMENTS

| | | | |
|---|---|---|---|
| 4,931,951 | 6/1990 | Murai et al. | 364/513 |
| 4,965,743 | 10/1990 | Malin et al. | 364/513 |
| 5,099,413 | 3/1992 | Sakai | 395/700 |
| 5,202,955 | 4/1993 | Hamilton et al. | 395/10 |
| 5,251,285 | 10/1993 | Inoue | 395/10 |
| 5,253,189 | 10/1993 | Kramer | 364/578 |
| 5,396,314 | 3/1995 | Umeda et al. | 355/207 |
| 5,463,545 | 10/1995 | Umeda et al. | 364/187 |

FOREIGN PATENT DOCUMENTS

320818   6/1989   European Pat. Off. .

OTHER PUBLICATIONS

Ishida, Y., "An application of qualitative reasoning . . . " Proc. 4th Conf. on AI Appl., Mar., 1988, pp. 124–129.
Sukhan, L. et al., "Building Models for reasoning in Qualitative Physics," SMC Int. Conf. 1990, pp. 593–598.
Homayoun Far, B., "Qualitative Control: . . . ", Int. Workshop MIV–89, Apr. 1989, pp. 239–244.
Abdulmajid, B. A., et al, "An extended qualitative controller" IEE Control 90, pp. 607–611.
The Handbook of Artificial Intelligence, vol. IV, Chapter XXI, 1989, pp. 325–413.
Norbert Brandli et al, "Neue Arbeitsmethoden in der Fertigungsvorbereitung", *Technische Rundschau*, vol. 84, No. 36, 4 Sep. 1992, Bern, CH, pp. 82–88, XP000316560.
Peter Barski, "Case im praktischen Einsatz", *Elektronik*, vol. 39, No. 8, 12 Apr. 1990, Munchen, DE, pp. 44–54, XP000113719.

*Primary Examiner*—Robert W. Downs
*Assistant Examiner*—A. Katbab
*Attorney, Agent, or Firm*—Beveridge, DeGrandi, Weilacher & Young, L.L.P.

[57] ABSTRACT

A method of automatically creating control sequence software required for a machine system controlled by a computer includes four algorithms, that is, "derivation of control sequence specification"→"derivation of a qualitative control sequence"→"addition of quantitative information (derivation of a quantitative control sequence)"→"generation of a C program". The qualitative control sequence is a state transition matrix following the time sequence. This qualitative control sequence is derived by making use of a qualitative inference system. A quantitative control sequence is obtained by adding quantitative time between states to the qualitative control sequence. Time information is calculated on the basis of design information of a machine portion stored in a design information database. As a result, it is possible to reduce the manual burden on the software development by using the present invention.

10 Claims, 17 Drawing Sheets

EXAMPLE OF FBS MODEL IMPUTTED

F I G. 5

| STATE | INITIAL STATE | STATE 1 phenomenon1 | | STATE 2 phenomenon 2 |
|---|---|---|---|---|
| CAUSED VIEW | | | | |
| S1 | low | | | high |
| S2 | low | low | high | high |
| X | x1 | x1 | | x3 |
| V | 0 | | | |
| C1 | off | on | | |
| C2 | off | | | on |
| C3 | off | | | |
| C4 | off | | | |

REQUIRED PARAMETER TRANSITION MAP

FIG. 6

CORRECTED PARAMETER TRANSITION MAP

| STATE<br>CAUSED VIEW | INITIAL STATE | STATE 1<br>phenomenon1<br>phenomenon4 | STATE 3<br>phenomenon3 | STATE 2<br>phenomenon2<br>phenomenon4 |
|---|---|---|---|---|
| S1 | low | low | low | high |
| S2 | low | high | high | high |
| X  | x1  | x1  | x2  | x3  |
| V  | 0   | v0  |     |     |
| C1 | off | on  |     |     |
| C2 | off |     | on  | on  |
| C3 | off |     |     |     |
| C4 | off | on  |     | on  |

FIG. 8

(NORMAL TIME)

| PARAMETER \ TIME | TIME 0 | TIME 1 | TIME 2 | TIME 3 | TIME 4 |
|---|---|---|---|---|---|
| MC MODE | | ON | | | |
| HI MODE | | | ON | | |
| Dev MODE | | | | ON | |
| TC MODE | | | | | ON |
| DRUM ANGLE | | A0 | A1 | A2 | A3 |
| CHARGING QUANTITY OF DRUM | NOTHING | NOTHING ↓ FULL | FULL ↓ EXPOSED | | |
| DRUM TONER DENSITY | NOTHING | | | NOTHING ↓ FULL | FULL |
| PHENOMENON ⇒ | INITIAL | PRINCIPAL CHARGING | EXPOSURE | DEVELOPMENT | TRANSFER |

RESULT OF EXECUTION OF SEQUENCE PROGRAM

CHANGE OBJECTIVE MODEL TO FUNCTIONAL REDUNDANT SYSTEM

FIG. 15

(METHOD 3)

| PARAMETER \ TIME | TIME 0 | TIME 1 | | TIME 4 |
|---|---|---|---|---|
| M~~C MODE~~ | | | FROM PHENOMENON KNOWLEDGE OF DEVELOPMENT | |
| HI MODE | | | | |
| Dev MODE | | | ON | |
| TC MODE | | ON | | ON |
| DRUM ANGLE | | A3 | A2 | A3 |
| CHARGING QUANTITY OF DRUM | NOTHING | NOTHING ↓ FULL | EXPOSED | |
| DRUM TONER DENSITY | NOTHING | | ? ↓ FULL | FULL |
| PHENOMENON ⇒ | INITIAL | PRINCIPAL CHARGING | DEVELOPMENT | TRANSFER |

PHENOMENON KNOWLEDGE
- DEVELOPMENT
    CONDITION
      - Dev MODE = ON
      - DRUM ANGLE = A2
      - DRUM CHARGE = Exposed
    EFFECT
      - DRUM TONER → FULL

F I G. 6

(TIME ι OCCURRENCE OF FAULT IN MAIN CHARGER)

| TIME / PARAMETOR | IME 0 | TIME 1 | TIME 2 | TIME 3 | TIME 4 |
|---|---|---|---|---|---|
| M~~C MODE~~ | | | | | |
| H I MODE | | | ON | | |
| Dev MODE | | | | ON | |
| T C MODE | | ON | | | ON |
| DRUM ANGLE | | A 3 | A 1 | A 2 | A 3 |
| CHARGING QUANTITY OF DRUM | NOTHING | NOTHING ↓ FULL | FULL ↓ EXPOSED | | |
| DRUM TONER DENSITY | NOTHING | | | NOTHING ↓ FULL | FULL |
| PHENOMENON ⇒ | INITIAL | PRINCIPAL CHARGING | EXPOSURE | DEVELOPMENT | TRANSFER |

REQUIRED BEHAVIOR

EXAMPLE OF DERIVED QUALITATIVE CONTROL SEQUENCE

METHOD OF AUTOMATICALLY CREATING CONTROL SEQUENCE SOFTWARE AND APPARATUS THEREFOR

BACKGROUND OF THE INVENTION

1. Field of the Invention

The present invention relates to a method of automatically creating control sequence software required for a machine system controlled by a computer and an apparatus for realizing the automatic creating method.

2. Description of the Prior Art

At the present time computer civilization advances, many machine systems are provided with computers, and the machine systems are controlled by the computers.

Description is made by taking a copying machine as an example. Electronic implementation and computerization of the copying machine have advanced, so that the operation of the copying machine is always controlled by a computer. In the development of the copying machine, therefore, not only the development of a machine portion but also the increase in the amount of work for developing software and particularly, control sequence software has become significant. This is one great cause of preventing work time and a development cycle from being shortened.

Therefore, some studies have been conventionally conducted to attempt to automatically create software and control sequence software. Examples are an article entitled "Toward Automation of Software Design" by Setsuo Osuga and Haruno Ri, Journal of Institute of Artificial Intelligence, Vol. 6, No. 2, pp. 159–166, 1991, and an article entitled "System for Automatically Creating Sequence Control Software" by Yasuko Nakayama, Katsuya Sadashige, Hiroyuki Mizutani, Minemoto Izaki, Materials for Study Meeting of Institute of Artificial Intelligence SIG-KBS-9003, pp. 71–79, Institute of Artificial Intelligence, 1990. Even if techniques in the conventional studies conducted to attempt to automatically create software or the like are directly applied to a copying machine or a general image forming apparatus or other machine systems, however, sufficient results cannot be obtained. One of the reasons is that the conventional technique of automatically creating software is not integrated with a machine system CAD. That is, it is difficult to organically relate control sequence software automatically created to the mechanical technique of the machine system (attribute values of parts, structure information and the like).

SUMMARY OF THE INVENTION

An object of the present invention is to provide a method of automatically creating control sequence software and an apparatus therefor which are solutions to the conventional problems.

In order to automatically create control sequence software according to the present invention, an objective machine system must satisfy the following conditions as a premise.

(1) The detailed design of a machine portion of the objective machine system has been terminated, to obtain attribute values of parts, structure information and information on sensors and actuators. The information may be manually inputted to an apparatus for automatically creating control sequence software according to the present invention, or may be automatically inputted from a database of a machine system CAD.

(2) Control sequence software required for the machine system is software which treats time control information such as on/off of an actuator but does not treat quantity control information such as a manipulated variable of an actuator.

The creation of control sequence software according to the present invention is carried out in the following procedure. First, control sequence specification is found on the basis of an FBS model of the objective machine system which is represented by a diagram for determining the relationship among functions, behaviors and states. A qualitative control sequence is derived on the basis of the found control sequence specification. The qualitative control sequence represents a state transition matrix of the objective machine system following the time sequence. This qualitative control sequence is derived by inferring conditions of parameters required to develop a required function.

Quantitative time between states, that is, quantitative information is added to the derived qualitative control sequence, thereby to obtain a quantitative control sequence.

This quantitative control sequence obtained is expressed in the rule form. Accordingly, the quantitative control sequence can be freely converted into a necessary programming language.

According to the present invention, therefore, when the objective machine system is controlled by a computer, control sequence software indispensable to the computer for control can be automatically created, thereby to make it possible to reduce the manual burden on the software development.

Particularly when the objective machine system comprises an additional control sequence program in addition to the basic control sequence program, and functional redundancy is realized by the additional control sequence program, the development work of the additional control sequence program is increased. If the present invention is made use of, however, the additional control sequence program can be automatically developed, thereby to make it possible to reduce the burden on the software development.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an example of a parameter transition map derived;

FIG. 6 is a diagram showing an example of a corrected parameter transition map which is physically noncontradictory;

FIG. 8 is a diagram showing a quantitative timing chart of a control operation in the electrophotographic copying machine;

FIG. 15 is a diagram for explaining a method of creating a qualitative sequence for developing a redundant function;

FIG. 16 is a diagram showing a qualitative timing chart in a case where a redundant function in the image forming mechanism is developed.

DESCRIPTION OF THE PREFERRED EMBODIMENTS

1. System Configuration

Figure 1:
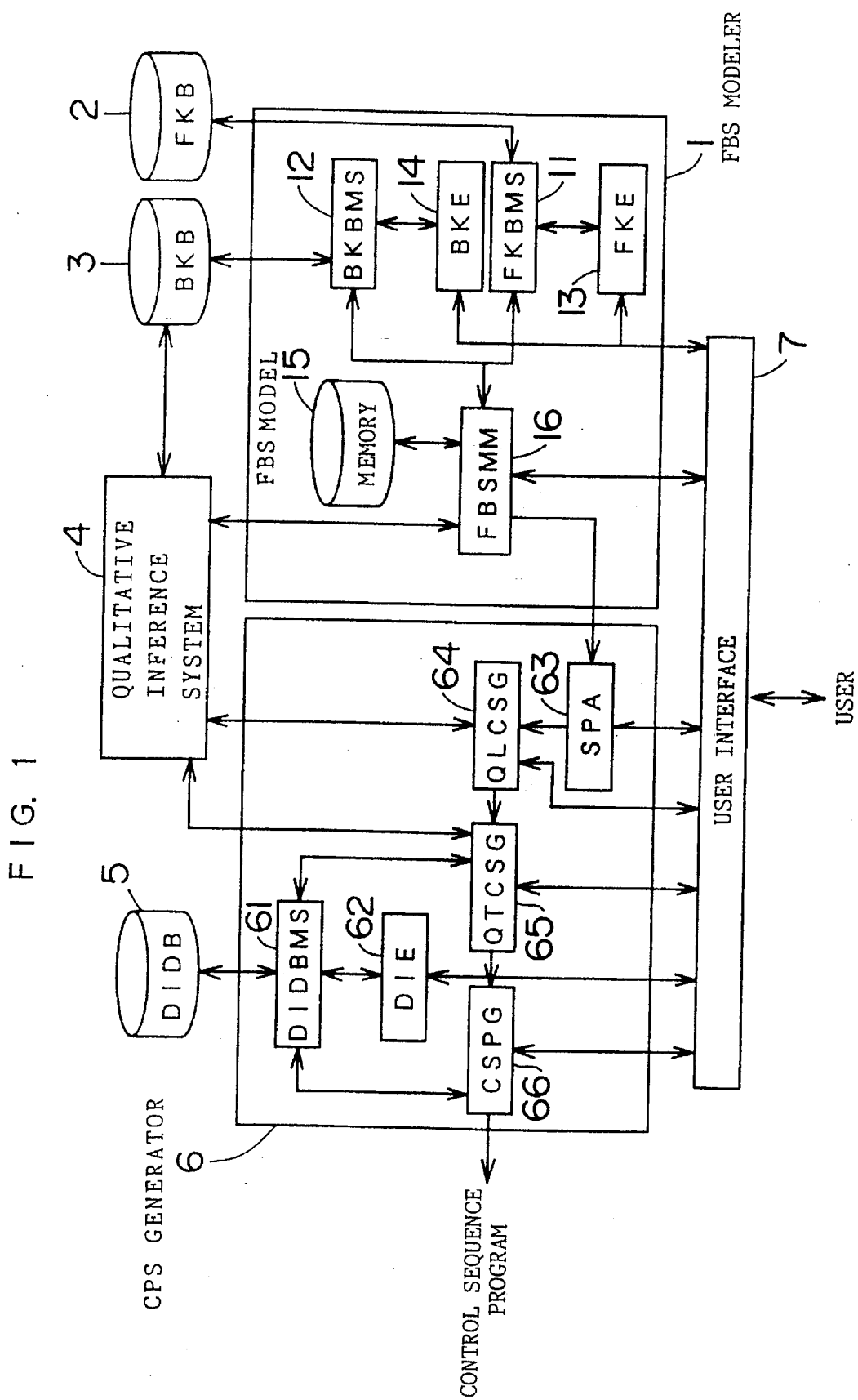
FIG. 1 is a diagram showing the system configuration of the whole of an apparatus for automatically creating a control sequence program according to one embodiment of the present invention.

Description is now made of a method of automatically creating a control sequence program according to one embodiment of the present invention. In this method, a control sequence program is automatically created from an FBS (Function-Behavior-State) model representing an objective machine (described in detail later). The system configuration of the whole of an apparatus for realizing this method is shown in FIG. 1.

A list of abbreviations described in respective blocks shown in FIG. 1 will be described below.

FKB: Function Knowledge Base

BKB: Behavior Knowledge Base

FKBMS: Function Knowledge Base Management System

BKBMS: Behavior Knowledge Base Management System

FKE: Function Knowledge Editor

BKE: Behavior Knowledge Editor

FBSMM: FBS Model Manager

DIDB: Design Information DataBase

DIDBMS: Design Information DataBase Management System

DIE: Design Information Editor

SPA: Specification Analyzer

QLCSG: Qualitative Control Sequence Generator

QTCSG: Quantitative Control Sequence Generator

CSPG: Control Sequence Program Generator

Description is made with reference to FIG. 1. This system for automatically creating a control sequence program comprises an FBS modeler 1, a function knowledge base (FKB) 2, a behavior knowledge base (BKB) 3, a qualitative inference system 4, a design information database (DIDB) 5, a CPS generator 6, and a user interface 7.

Knowledge concerning functions is stored in the function knowledge base (FKB) 2, and knowledge concerning behaviors is stored in the behavior knowledge base (BKB) 3.

The knowledge concerning functions which is stored in the function knowledge base 2, that is, the function knowledge is described in the form shown in Table 1.

TABLE 1

| Definition of Function Knowledge | |
|---|---|
| item | contents |
| name | verb + object |
| developing method | network of partial functions |
| realization behavior | network of view |

In Table 1, the item "name" is a label representing a function, and is described in the form of "a verb+an object (which can be plural)". When the function is constituted by a plurality of partial functions, a network of the partial functions is described in the item "development method". In the item "realization behavior", a network of a view is described. A view is a general term of an individual, an individual view and a process view. This view is a method of representing a behavior and a state on the basis of the qualitative process theory by K. D. Forbus. That is, in the qualitative process theory, the physical world is described utilizing as a unit "a physical phenomenon". Specifically, a physical behavior and a physical state are described by a basic category of an individual, an individual view and a process view.

The individual is a label representing an object or an entity which exists in the machine.

The individual view describes the state of an individual and the relationship among individuals. For example, the individual view describes the presence of parameters representing states such as the weight W, the volume V and the density D in a certain object (entity) and the relationship of D=W/V among the parameters.

The process view describes a physical phenomenon which occurs on the state description constituted by an individual and an individual view. For example, the free drop motion, the discharge phenomenon and the like are respectively process views.

The individual view and the process view are described by the occurrence conditions (the premise conditions) and the effect after the occurrence. The function knowledge is thus represented as the network of a view, and is given a name comprising a verb and an object. The named function knowledge is referred to as a physical feature. The physical feature is knowledge which is a combination of phenomena frequently appearing at the time of the design and the maintenance.

On the other hand, the knowledge concerning behaviors stored in the behavior knowledge base 3, that is, the behavior knowledge is described using the above described view by a category shown in Table 2.

TABLE 2

Definition of View

| item | small item | contents |
| --- | --- | --- |
| view | | name of view |
| upper class | | name of upper hierarchy |
| premise conditions | premise | view necessary as premise |
| | relation | relation between premise views |
| | qualitative conditions | conditions of parameter value |
| effect | parameter | parameter added |
| | qualitative relation | qualitative proportional relation added |
| | effect | qualitative differential relation added |

As shown in Table 2, the category of a view includes respective items, that is, "view", "upper class", "premise conditions" and "effect". The name of the view is described in the item "view", and the name of the upper hierarchy of the view is described in the item "upper class". The item "premise conditions" is divided into small items, that is, "premise", "relation" and "qualitative conditions". Views necessary as a premise, the relationship between the views necessary as a premise, and the conditions of, when a qualitative parameter value exists, the qualitative parameter value are respectively described in the small items. The item "effect" is divided into small items, that is, "parameter", "qualitative relation" and "effect", and a qualitative parameter added, the qualitative proportional relation added and the qualitative differential relation added are respectively described in the small items.

Table 3 shows examples of specific views.

TABLE 3

Example of Views

| | | Phenomenon | | | |
| --- | --- | --- | --- | --- | --- |
| view | | 1 | 2 | 3 | 4 |
| premise conditions | premise qualitative conditions | Entity 1<br>X = x1<br>S2 = low<br>C1 = on | Entity 1<br>X = x3<br>S1 = high<br>S2 = high<br>C2 = on | Entity 1<br>X = x2<br>S1 = low<br>S1 = high<br>C3 = on | Entity 1<br>C4 = on |
| effect | parameter effect | S2 = high | | S2 = high | $V = v0$<br>$\frac{dX}{dt} V$ |

In Table 3, "Phenomenon 1", "Phenomenon 2", "Phenomenon 3" and "Phenomenon 4" are respectively views, and the premise conditions and the effect are described in each of the views.

The contents of the views stored in the behavior knowledge base (BKB) 3, that is, the physical cause and effect relation at a behavior level is managed by the qualitative inference system 4.

The retrieval of the function knowledge or the behavior knowledge stored in the function knowledge base (FKB) 2 or the behavior knowledge base (BKB) 3 and the management of a backup or the like are respectively carried out by a function knowledge base management system (FKBMS) 11 or a behavior knowledge base management system (BKBMS) 12. In addition, if a user performs operations such as addition and correction of the function knowledge or the behavior knowledge, an operation signal is applied to a function knowledge editor (FKE) 13 or a behavior knowledge editor (BKE) 14 through the user interface 7, thereby to realize the addition, the correction and the like.

Meanwhile, the representation of an objective machine by an FBS (Function-Behavior-State) diagram shall be referred to as an FBS model. That is, the representation of an objective machine by a diagram comprising functions, behaviors and states is an FBS model. In the FBS model, states S and behaviors B are combined with each other by a physical law. Accordingly, a knowledge base of the physical law is constructed, thereby to make it possible to manage noncontradiction between the state representation and the behavior representation of the objective machine by a computer.

Furthermore, the relationship between functions F and behaviors B depends on a human subject. Many functions F can correspond to the same behavior B, or vice versa depending on the point of view.

If an electrophotographic copying machine is taken as an example, a plurality of behaviors such as a behavior "a photosensitive drum is exposed to light from a neutralization lamp so that electrostatic charges are grounded" and a behavior "electrostatic charges on a photosensitive drum are canceled by a discharge phenomenon of a charger" may correspond to a function "remove charges on a photosensitive drum". A many-to-many correspondence between functions F and behaviors B is a basis for making the concept of functional redundancy as described later in the objective machine possible. If the FBS model is used, it is possible to clearly represent the many-to-many correspondence.

Figure 2:
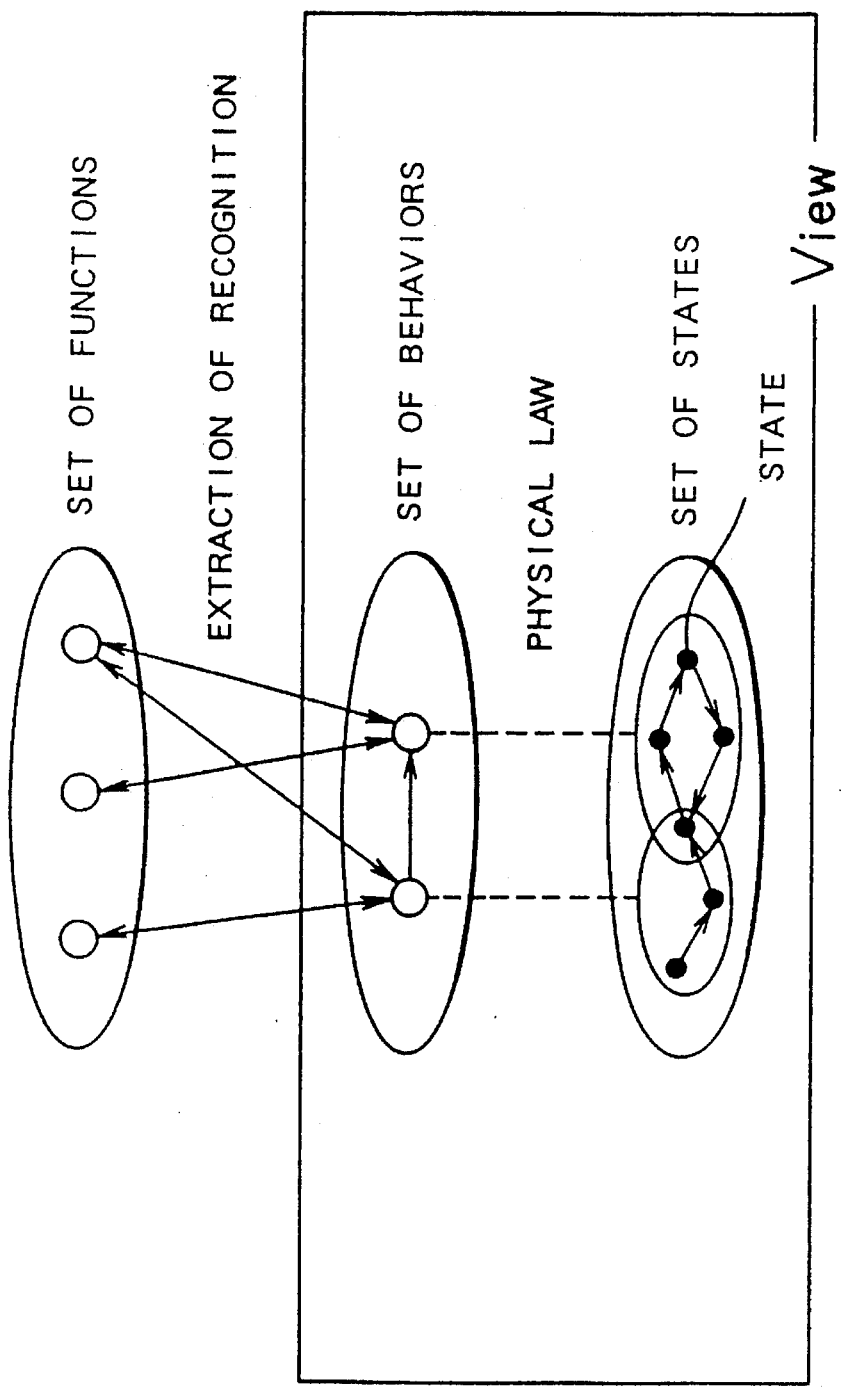
FIG. 2 is a diagram showing the relationship among functions, behaviors and states in an FBS model.

The relationship among functions, behaviors and states in the FBS model is shown in FIG. 2. In FIG. 2, a set of states and a set of behaviors are combined with each other by a physical law, and the set of behaviors and the set of functions correspond to each other by extraction of recognition.

The FBS model data is inputted and stored in a memory 15 through the user interface 7 and an FBS model manager (FBSMM) 16, as described later. The FBS model stored in the memory 15 is managed by the FBS model manager (FBSMM) 16. In addition, a user can retrieve or utilize the function knowledge or the behavior knowledge stored in the function knowledge base (FKB) 2 or the behavior knowledge base (BKB) 3 through the FBS model manager (FBSMM) 16. Furthermore, the user accesses the qualitative inference system 4 through the FBS model manager (FBSMM) 16, thereby to do behavior simulation using qualitative inference. The details of the behavior simulation using qualitative inference is described in the prior application of the applicant (for example, Japanese Patent Laid-Open Gazette No. 264458/1993) and hence, the description thereof is omitted.

On the other hand, the CSP (Control Sequence Program) generator 6 is for creating a control sequence program which characterizes the present embodiment, which utilizes data in the design information database (DIDB) 5 which is a database storing qualitative information concerning parts, structures and the like at the time of the generation. Table 4 shows an example of the definition of design information data stored in the design information database (DIDB) 5, and Table 5 shows a concrete example of design information data based on the definition.

TABLE 4

Definition of Design Information Data

| name of part | name of part | | | |
| --- | --- | --- | --- | --- |
| connection | connecting part | relation | direction | comment |
| parameter | name of parameter | qualitative value | quantitative value | comment |

TABLE 5

Example of Design Information Data

| name of part | rack | | | |
| --- | --- | --- | --- | --- |
| connection | connecting part | relation | direction | comment |
| | table | fixed | 0 | upward |
| | pinion | transmission of motion | 180 | downward |
| parameter | name of parameter | qualitative value | quantitative value | comment |
| | X | x1 | 0 mm | position |
| | | x2 | 20 mm | |
| | | x3 | 60 mm | |
| | M | m | 4 | module |

As shown in Table 4, design information data is defined by items "name of part", "connection" and "parameter". The item "connection" includes "connecting part", "relation", "direction" and "comment". In addition, the item "parameter" includes "name of parameter", "qualitative value", "quantitative value" and "comment".

Consequently, one example of specific design information data is as shown in Table 5.

Looking up data in the design information database (DIDB) 5 and management of a backup or the like are realized by a design information database management system (DIDBMS) provided in the CSP generator 6. In addition, operations such as input and correction of design information data by the user are realized by a design information editor (DIE) 62 provided in the CSP generator 6.

When a control sequence program is generated using the present embodiment, the detailed design of the machine portion of the objective machine has been terminated as a premise, as described above. Accordingly, all attribute values of parts constituting the objective machine, structure information, information on sensors, actuators and the like are previously stored in the design information database (DIDB) 5 as design information data.

Design information data need not be inputted manually by the user. For example, design information data in an intelligent CAD may be automatically stored in the design information database (DIDB) 5 by connecting the intelligent CAD and the design information database management system (DIDBMS) 61 to each other.

The CSP generator 6 further comprises a specification analyzer (SPA) 63, a qualitative control sequence generator (QLCSG) 64, a quantitative control sequence generator (QTCSG) 65, and a control sequence program generator (CSPG) 66. Derivation of control sequence specification shown in FIG. 3, derivation of a qualitative control sequence, addition of quantitative information, and generation of a C program shown in FIG. 3 are carried out by the four systems 63, 64, 65 and 66.

Figure 3:
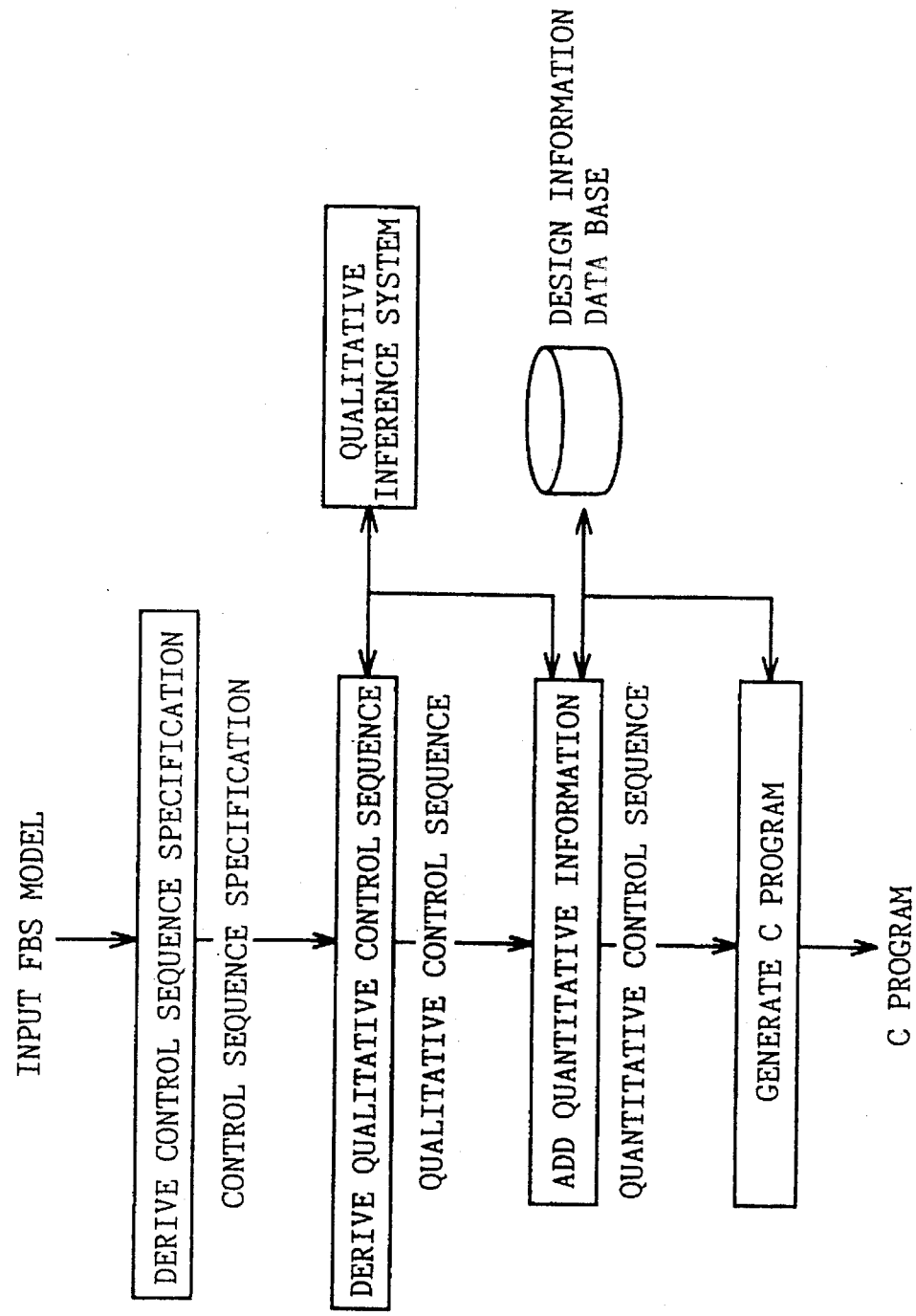
FIG. 3 is a diagram showing the flow of a method of automatically creating a control sequence block according to the present embodiment.

FIG. 3 shows the flow of a method of automatically generating a control sequence program according to the present embodiment. As shown in FIG. 3, the flow of the method of automatically generating a control sequence program is roughly divided into four algorithms, that is, "derivation of control sequence specification"→"derivation of a qualitative control sequence"→"addition of quantitative information (derivation of a quantitative control sequence)"→"generation of a C program". In FIG. 3, the qualitative control sequence is a state transition matrix following the time sequence. The quantitative control sequence is determination of quantitative time between states constituting the state transition matrix. In deriving the qualitative control sequence and the quantitative control sequence, the qualitative inference system 4 is made use of. Further, in deriving the quantitative control sequence and generating the C program, information stored in the design information database (DIDB) 5 is made use of.

The contents of the algorithms will be described with reference to FIG. 1.

2. Derivation of Control Sequence Specification

If the FBS model is inputted by the user, control sequence specification is first derived by the system shown in FIG. 1. Specifically, in the system shown in FIG. 1, the time sequence of functions required to develop a required function is derived on the basis of the time sequence relationship added between functions described in the FBS model. In addition, knowledge concerning the realization behavior in the foregoing Table 1 is read out from the function knowledge base (FKB) 2 and the behavior knowledge base (BKB) 3, to derive the time sequence of a view required to realize respective partial functions. The initial conditions and the final conditions of the machine described in a required function node are added to this derived time sequence, thereby to derive the control sequence specification.

Figure 4:
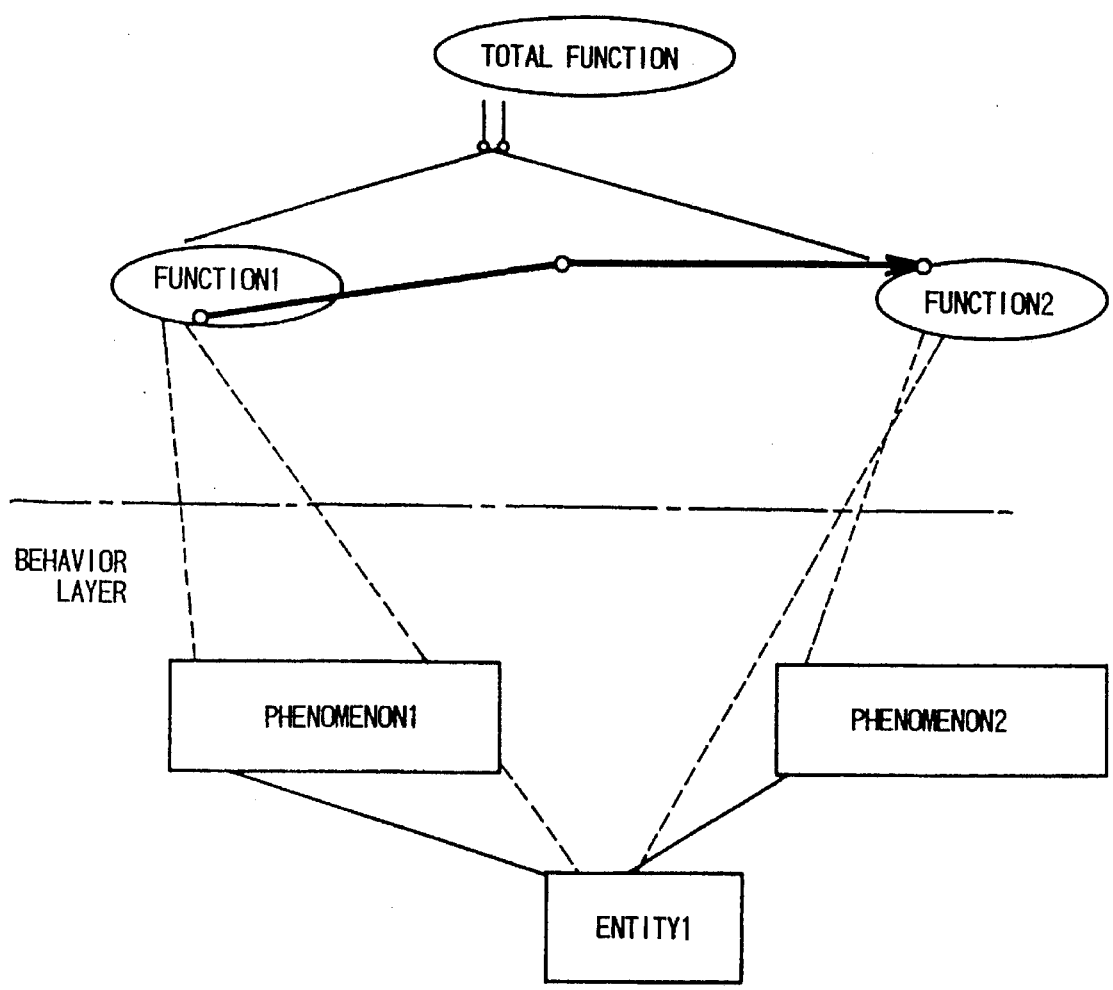
FIG. 4 is a diagram showing an example of an FBS model inputted by a user in the present embodiment.

FIG. 4 shows an example of the FBS model inputted by the user. In FIG. 4, an arrow from "function 1" to "function 2" represents the time sequence relationship. In order to realize the required function, therefore, the function sequence from "function 1" to "function 2" is required, and "Phenomenon 1" and "Entity 1" are required behaviors for "function 1", and "Phenomenon 2" and "Entity 1" are required behaviors for "function 2". Accordingly, the contents shown in Table 6 are derived as the control sequence specification. The initial conditions in a state 1 in Table 6 are initial conditions of the machine described in the required function node.

TABLE 6

Control Sequence Specification

| state | state 1 | state 2 |
| --- | --- | --- |
| required | Phenomenon 1 | Phenomenon 2 |
| view | Entity 1 | Entity 1 |
| initial | S1 = low, S2 = low | |
| conditions | X = x1, V = 0 | |
| | C1 = off, C2 = off | |
| | C3 = off, C4 = off | |

3. Derivation of Qualitative Control Sequence

A qualitative control sequence is then derived from the control sequence specification found in the above described manner.

The qualitative control sequence is derived in the following manner.

First, the qualitative control sequence generator (QLCSG) 64 inquires of the qualitative inference system 4 the conditions of parameters required to cause "Phenomenon 1" and "Phenomenon 2" which are required views described in the control sequence specification found in the above described manner. In response thereto, the qualitative inference system 4 reads out the behavior knowledge stored in the behavior knowledge base (BKB) 3 and specifically, the premise conditions and the effect of a corresponding view out of a lot of views shown in, for example, Table 5 and outputs the same. In the qualitative control sequence generator (QLCSG) 64, a parameter transition map is derived on the basis of an output of the qualitative inference system 4. For example, a map shown in FIG. 5 is derived as the parameter transition map.

Meanwhile, the parameter transition map shown in FIG. 5 is not always physically noncontradictory. For example, a parameter S1 should be high in a state 2, while being low in the initial state. Some parameters are operable and the other parameters are not operable by actuators on the machine. For example, it is assumed that the parameters S1 and S2 are parameters which are not operable, and the parameters C1, C2, C3 and C4 are parameters which are operable. Consequently, the parameter S1 which is not operable differs depending on whether it is in the initial state or the state 2. Accordingly, a parameter operation must be indirectly performed by causing a physical phenomenon between the state 1 and the state 2. Therefore, the qualitative control sequence generator (QLCSG) 64 inquires of the qualitative inference system 4 the most suitable view for causing the parameter change. As a result, a parameter transition map is corrected to noncontradictory one. In this example, the necessity to cause "Phenomenon 3" out of a plurality of views shown in the foregoing Table 3 in order to change the parameter S1 from "low" to "high" is derived. This inference is repeated, thereby to derive a physically noncontradictory parameter transition map shown in FIG. 6.

In FIG. 6, "Phenomenon 3" is caused as a state 3 between the state 1 and the state 2. In addition, "Phenomenon 4" is caused in order to change the parameter X in the order of x1, x2 and x3 between the state 1 and the state 2.

If the parameter transition map first derived in the qualitative control sequence generator (QLCSG) 64 is physically noncontradictory, it goes without saying that correction processing of the above described parameter transition map need not be performed. Specifically, in the deriving process of the qualitative control sequence, correction processing of the parameter transition map is not indispensable. That is, the processing can be omitted if no correction is required.

4. Addition of Quantitative Information (Derivation of Quantitative Control Sequence)

Quantitative information is added to the qualitative control sequence generated in the above described manner. The quantitative information is added in the quantitative control sequence generator (QTCSG) 65.

As described above, it can be considered that in the behavior representation using the FBS diagram, the state transition in the qualitative control sequence is caused not at random but by the physical law. Consequently, the state transition can be processed as one caused by the cause and affect relation represented by a differential equation between parameters. Specifically, if there is a relationship of $d\alpha/dt=\beta$ between parameters $\alpha$ and $\beta$, and $\alpha$ is changed and $\beta$ is not changed between two states, time $\Delta t$ between the two states can be calculated by $\Delta t=\Delta\alpha/\beta$.

A quantitative value obtained from the design information database (DIDB) 5 is added to the respective parameter values to perform calculations utilizing the relationship of $d\alpha/dt=\beta$, thereby to obtain a quantitative control sequence.

In the case of the parameter transition map shown in FIG. 6, time between states is calculated in the following manner utilizing the relationship of $dX/dt=V$.

It is first found that a parameter X and a parameter V respectively represent the position and the speed of the rack shown in the foregoing Table 5 from the FBS model and the contents of the design information database (DIDB) 5. The data concerning this part in the design information database (DIDB) 5, that is, the data shown in the table 5 is referred to by the quantitative control sequence generator (QTCSG) 65, thereby to obtain x1=0 (mm), x2=20 (mm) and x3=60 (mm). Similarly, it is found that v0=200 (mm/s) holds from the connection between parts and the quantitative information shown in the table 5.

It is found from the data thus found that time from the state 1 to the state 3 is 100 (ms), and time from the state 3 to the state 2 is 200 (ms).

As a result, if the parameter S1 and the parameter S2 are parameters which are not operable, for example, sensor parameters, and the parameters C1, C2, C3 and C4, for example, are parameters which are operable as described above, the following quantitative control sequences are generated in the rule form:

if low (S1) & low(S2) & off (C1) & off (C2) & off (C3) & off (C4), then make (C1,on) & make (C4,on)

if low (S1) & high (S2) & on (C1) & off (C2) & off (C3) & on (C4), then make (C3,on,100 ms)

if high (S1) & high (S2) & on (C1) & off (C2) & on (C3) & on (C4), then make (C2,on,200 ms)

5. Conversion into Programming Language

Thereafter, in the control sequence program generator (CSPG) 66, the conversion of each sensor or each actuator into a port address and quantization of a value cause this rule to be converted into, for example, an execution program on a C language.

6. Example 1

Description is now made of a case where the objective machine is an electrophotographic copying machine.

Figure 7:
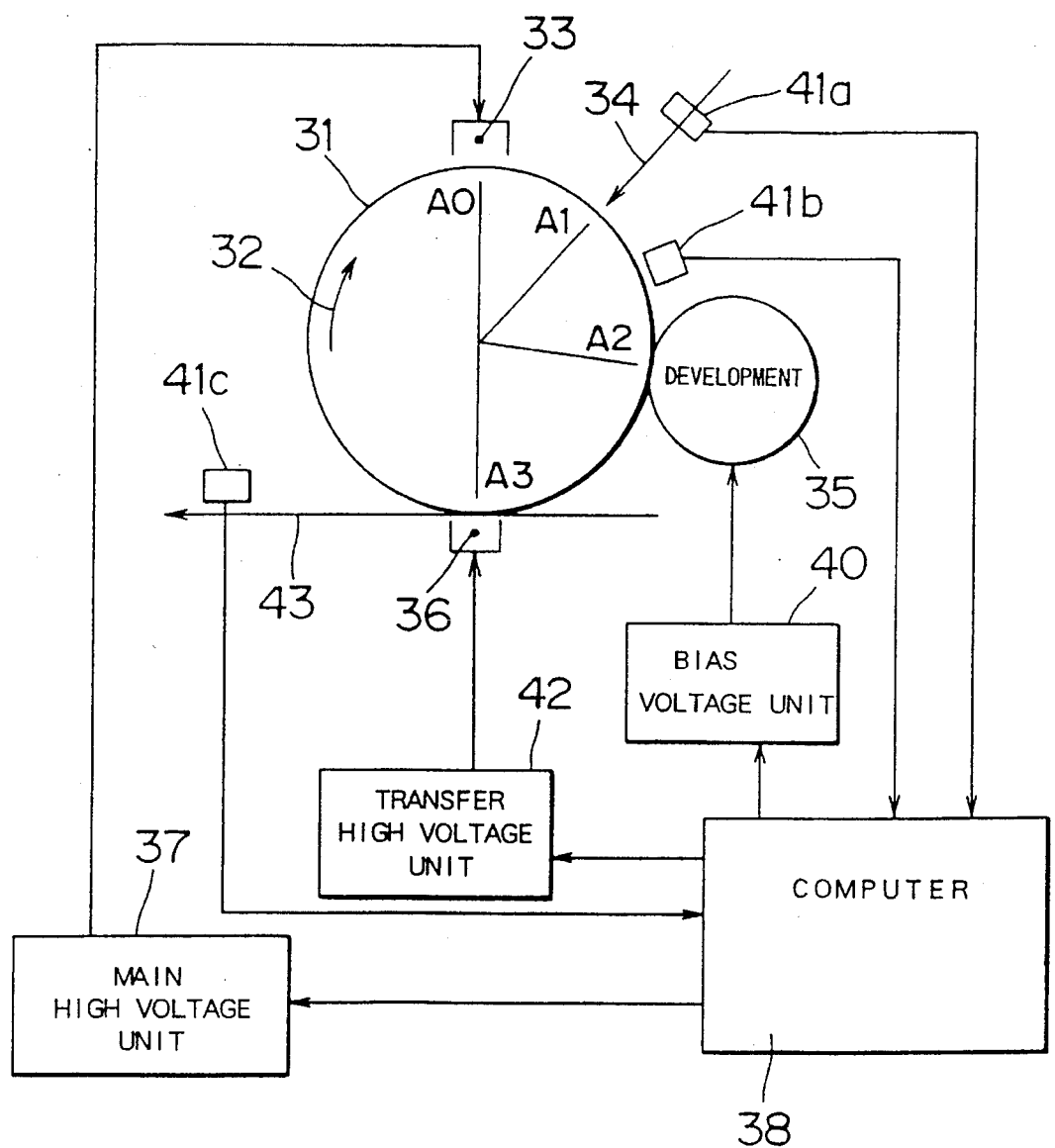
FIG. 7 is a block diagram showing the control structure of an image forming mechanism in an electrophotographic copying machine.

FIG. 7 is a block diagram showing the control structure of an image forming mechanism in the electrophotographic copying machine.

In the structure shown in FIG. 7, a photosensitive drum 31 is rotated at predetermined speed in a direction indicated by an arrow 32, to be respectively principally charged at a drum angle A0, exposed at a drum angle A1, developed at a drum angle A2, and transferred at a drum angle A3. Therefore, a main charger 33 is disposed opposed to the drum angle A0 around the photosensitive drum 31, and the photosensitive drum 31 is exposed to original reflected light 34 at the drum angle A1. In addition, a developing device 35 is provided opposed to the drum angle A2, and a transferring corona discharger 36 is disposed opposed to the drum angle A3.

A high voltage is applied to the main charger 33 from a main high voltage unit 37 controlled by a computer 38. For example, a high voltage of +5.7 kV is applied to the main charger 33, so that the main charger 33 induces corona discharge, to uniformly charge the surface of the photosensitive drum 31.

If the photosensitive drum 31 whose surface is uniformly charged by the main charger 33 at the drum angle A0 is rotated to make the drum angle A1, the surface of the photosensitive drum 31 is exposed to the original reflected light 34. The amount of the original reflected light 34 is measured by an AE sensor 41a, to be applied to the computer 38. In addition, the surface potential of the photosensitive drum 31 which is exposed to the original reflected light 34 and from which charges charged on an exposed portion are removed is measured by a surface potential sensor 41b, to be applied to the computer 38.

Furthermore, if the photosensitive drum 31 is rotated to make the drum angle A2, development is performed by the developing device 35. At this time, a developing bias voltage of, for example, +250 V is applied to the developing device 35 by a bias voltage unit 40. The bias voltage unit 40 is also placed under the control of the computer 38.

Additionally, if the photosensitive drum 31 is rotated to make the drum angle A3, the computer 38 applies a driving signal to a transfer high voltage unit 42. A high voltage of, for example, +6.5 kV is applied to the transferring corona discharger 36 from the transfer high voltage unit 42, so that the transferring corona discharger 36 induces corona discharge, to transfer toner on the surface of the photosensitive drum 31 to paper 43 conveyed. The density of a toner image transferred on the paper 43 is detected by a density sensor 41c, to be applied to the computer 38.

The computer 38 monitors a state where an image is to be formed on the basis of detected values given from the three sensors, that is, the AE sensor 41a, the surface potential sensor 41b and the density sensor 41c.

Consequently, the computer 38 must carry out such control as to respectively operate the main charger 33, the developing device 35 and the transferring corona discharger 33 in the above described manner when an end of a region where an image is to be formed of the photosensitive drum 31 makes the drum angles A0, A2 and A3. In addition, the original reflected light 34 must be supplied to the photosensitive drum 31 when the end of the region where an image is to be formed of the photosensitive drum 31 makes the drum angle A1. The computer 38 stores a control sequence program required therefor.

The control sequence program stored in the computer 38 can be generated by the above described method of automatically generating a control sequence program.

In this case, data concerning the electrophotographic copying machine are stored in the function knowledge base (FKB) 2 and the behavior knowledge base (BKB) 3 shown in FIG. 1. Specifically, the structure of the electrophotographic copying machine is described using the FBS diagram and stored. The structure comprises parts constituting the electrophotographic copying machine, the nature of the relationship among the parts and physical phenomena, and is described as the above described network of a view which is a general term of an individual, an individual view and a process view. All physical phenomena which can occur with respect to the described network of a view are derived by behavior simulation in the qualitative inference system 4, and the holding conditions and the like are derived, so that the state description is managed by an ATMS (Assumption based Truth Maintenance System: advocated by De Kleer).

Furthermore, an FBS model is inputted. The FBS model is description of required behaviors for the electrophotographic copying machine. The following are concrete examples:

(1) Input of instantaneous state: phenomena, parameter values and the like which are desired to occur at a minimum in a certain state.

(2) Input of the time sequence relationship between states: the representation of the time relationship between instantaneous states, for example, enumeration of phenomena which are desired to occur such as "principal charge→transfer" and enumeration of parameter changes such as "Paper image nothing→Paper image full".

Control sequence specification is derived in the same manner as described above on the basis of the above described stored structure and the above described inputted FBS model, that is, the required behaviors, a qualitative control sequence is derived, and a quantitative control sequence to which quantitative information is added is derived until finally a control sequence program using, for example, a C language is generated.

FIG. 8 shows a qualitative timing chart of a control operation in this electrophotographic copying machine, that is, a parameter transition map.

Addition of time lengths to time 0 to time 4 in FIG. 8 is addition of quantitative information. The time lengths of the time 0 to the time 4 are calculated in the following manner.

If R and V are respectively taken as the diameter and the rotation speed of the photosensitive drum 31, the peripheral length thereof is $\pi R$, and time required for the photosensitive drum 31 to rotate once is $\pi R/V$. If the time when the drum angle is A0, that is, the time 1 is the reference time, i.e., zero, therefore, the time 2 becomes $(\pi R/V) \times ((A1-A0)/2\pi)$. Similarly, the time 3 becomes $(\pi R/V) \times ((A2-A0)/2\pi)$, and the time 4 becomes $(\pi R/V) \times ((A3-A0)/2\pi)$.

The time thus calculated, that is, the quantitative information is applied, thereby to obtain a quantitative control sequence program.

Figure 9A:
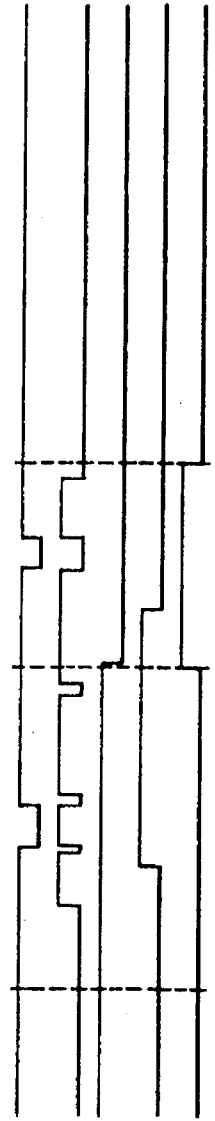
FIGS. 9A and 9B are output diagrams showing the results of measurements made using a logic analyzer of the results of execution in a case where the control sequence program, automatically generated according to one embodiment of the present invention, is executed in the electrophotographic copying machine.
Figure 9B:
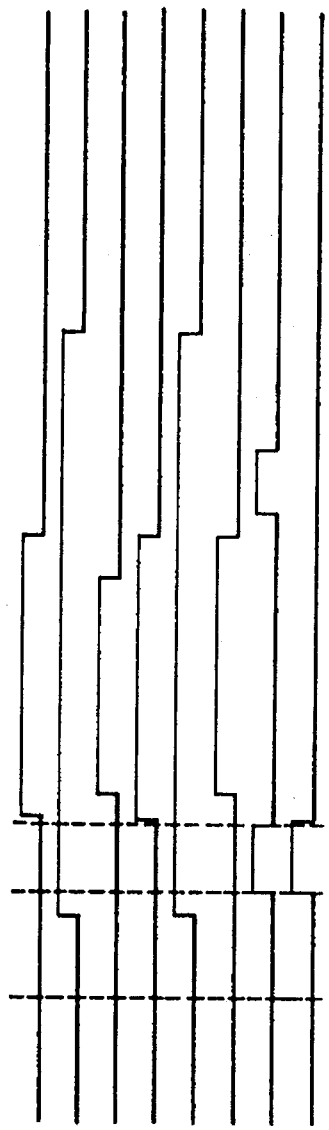

The results of execution in a case where the control sequence program thus generated is executed in the above described electrophotographic copying machine are measured by a logic analyzer, and the results of the measurement are shown in FIGS. 9A and 9B. As a result of the experiment, it can be confirmed that the electrophotographic copying machine can correctly perform a copying operation.

The control sequence program generated in the foregoing manner is also applicable to the other image forming apparatuses by storing the program in, for example, a ROM.

7. Example 2

The present invention can not only automatically create a control sequence program in a case where the electrophotographic copying machine performs a normal operation as described above but also automatically create, in a functional redundancy type self-repair image forming apparatus according to the prior application of the applicant (Japanese Patent Application Serial Nos. 3-336725 to 3-336732; Counterpart U.S. patent application is Ser. No. 07/989,512), an additional control sequence program to be added to the image forming apparatus so as to realize functional redundancy. The additional control sequence program for realizing the functional redundancy requires a maximum of $2^n$ control sequence programs so as to add n functional redundancy systems to, for example, the machine, so that the great burden is imposed on the program development. It is highly desirable to allow the control sequence programs to be automatically generated using the present invention because the burden on the software development can be reduced.

Description is now made of a method of automatically generating a control sequence program so as to realize functional redundancy in the electrophotographic copying machine described in FIG. 7.

For example, consider automatic generation of a control sequence program for developing a functional redundancy system in a case where a fault "a main charger breaks down" occurs in the electrophotographic copying machine.

Figure 10:
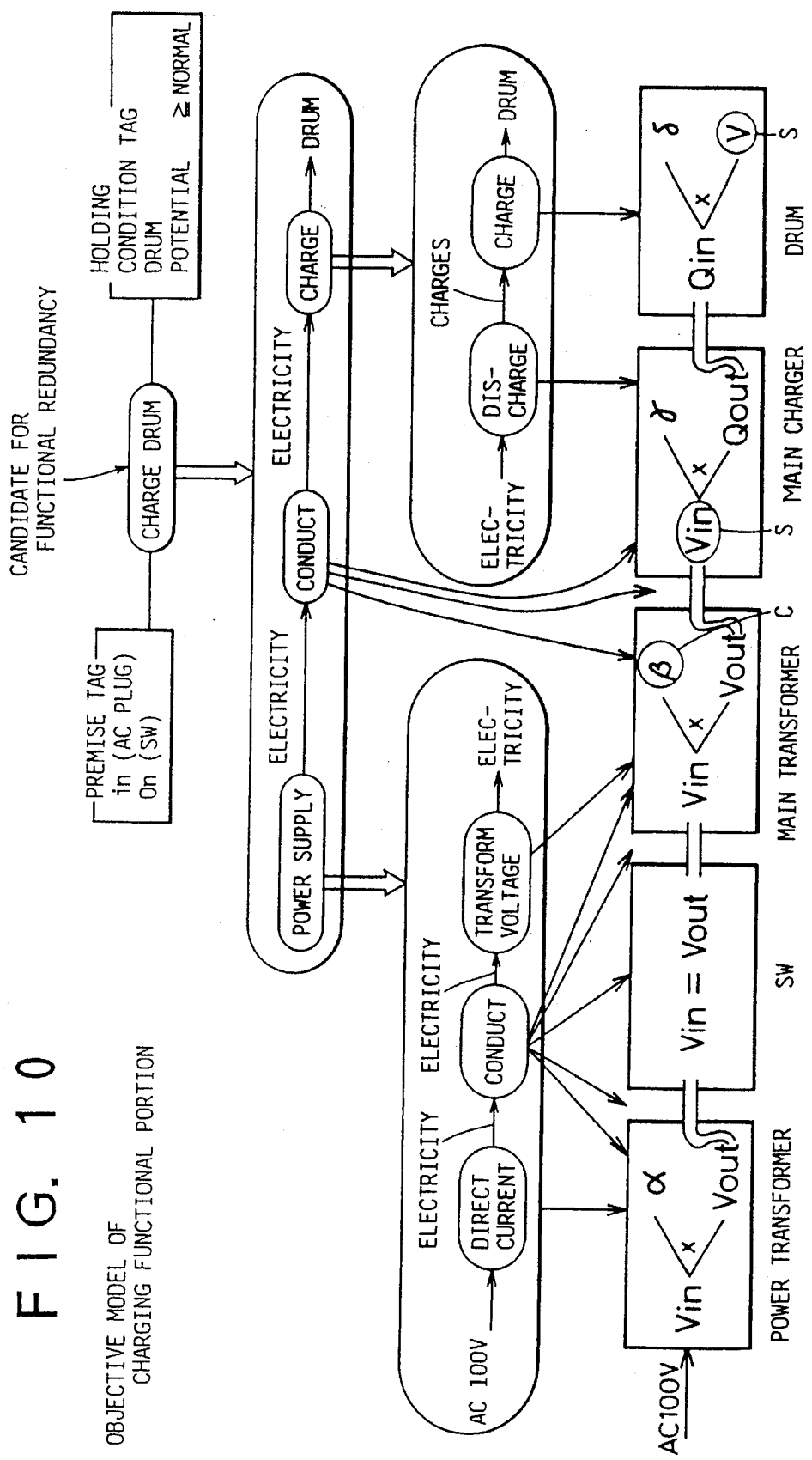
FIG. 10 is a diagram showing an example of an inputted FBS model in a charging functional portion.

In this case, an FBS model utilizing a charging functional portion as an objective model is inputted from the user to the FBS modeler 1 shown in FIG. 1 as a premise. An example of the inputted FBS model in the charging functional portion is shown in FIG. 10.

Figure 11:
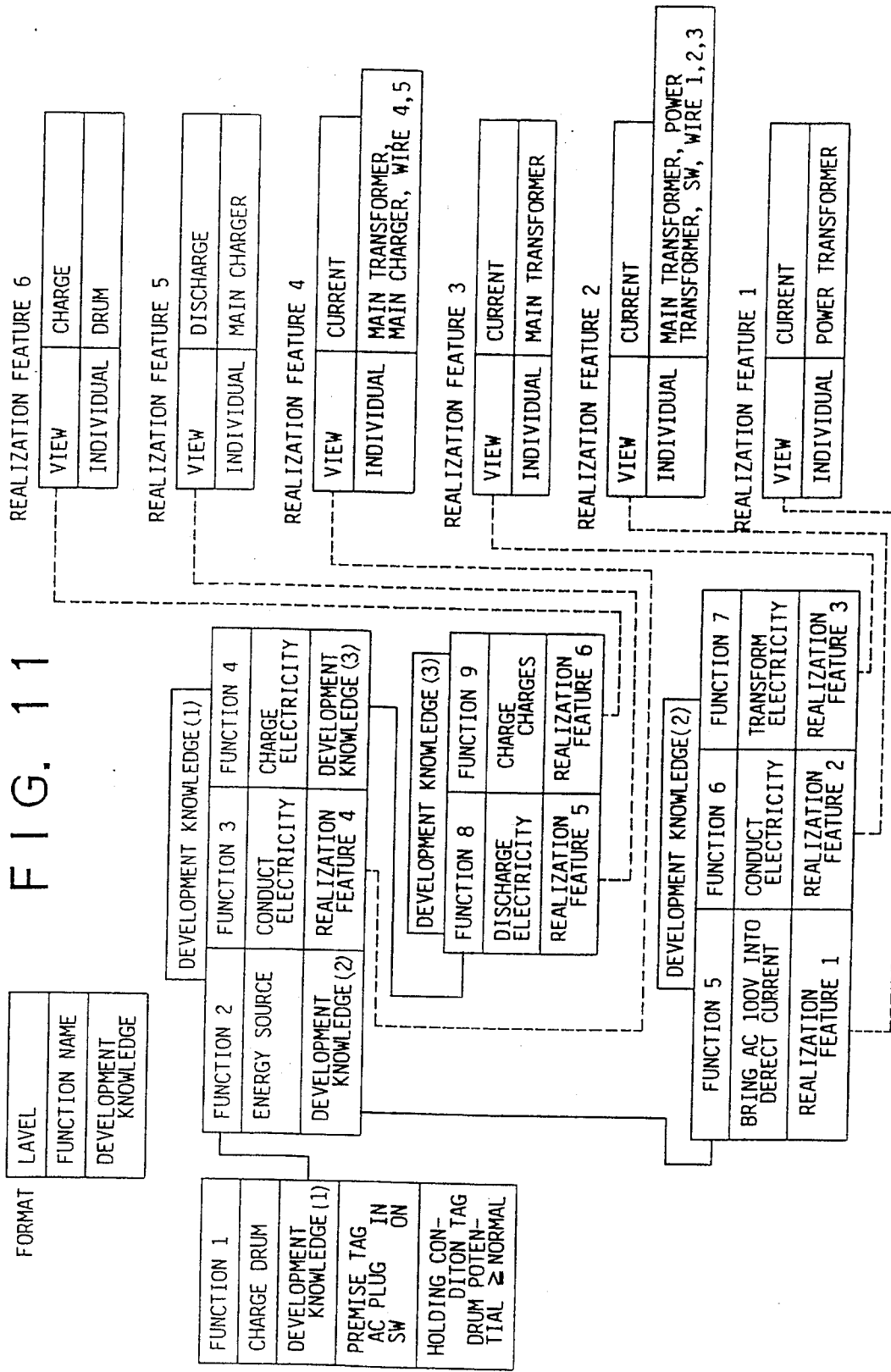
FIG. 11 is a diagram showing the contents of function knowledge and development knowledge concerning a charging function of a photosensitive drum.

FIG. 11 shows the contents of function knowledge and development knowledge in a charging function of the photosensitive drum 31e. In FIG. 11, a function name "change a drum" is described in a label "Function 1", and development knowledge (1) is described therein. In addition, "a power plug is inserted and a power switch is turned on" is described as a premise tag, and "a drum potential≧normal (a reference potential)" is described as a holding condition tag. The function knowledge is so developed as to construct a hierarchical structure on the basis of the development knowledge (1). That is, the development knowledge (1) indicates respective labels "Function 2", "Function 3" and "Function 4", and "Function 2" and "Function 4" are respectively developed into development knowledge (2) and development knowledge (3). Furthermore, a function name "conduct electricity" is described in "Function 3", and "a realization feature 4: view=current, individual=main transformer, main charger and wires 4 and 5" is described as its realization feature. The development knowledge shown in FIG. 11 follows a method of describing function knowledge and a method of describing a view previously described.

If the above described FBS model is applied, the FBS modeler 1 retrieves a charging function which is substituted for the main charger 33 so as to charge the photosensitive drum 31 on the basis of the above described applied FBS model, function knowledge and behavior knowledge using the qualitative inference system 4. That is, the FBS modeler 1 retrieves a candidate for functional redundancy in a function lost by a fault such as "charging function". As a result, a functional redundancy system using the transferring corona discharger 36 is selected. An FBS model shown in FIG. 12 is obtained as an FBS model in a case where the transferring corona discharger 36 is used as a functional redundancy system.

Figure 12:
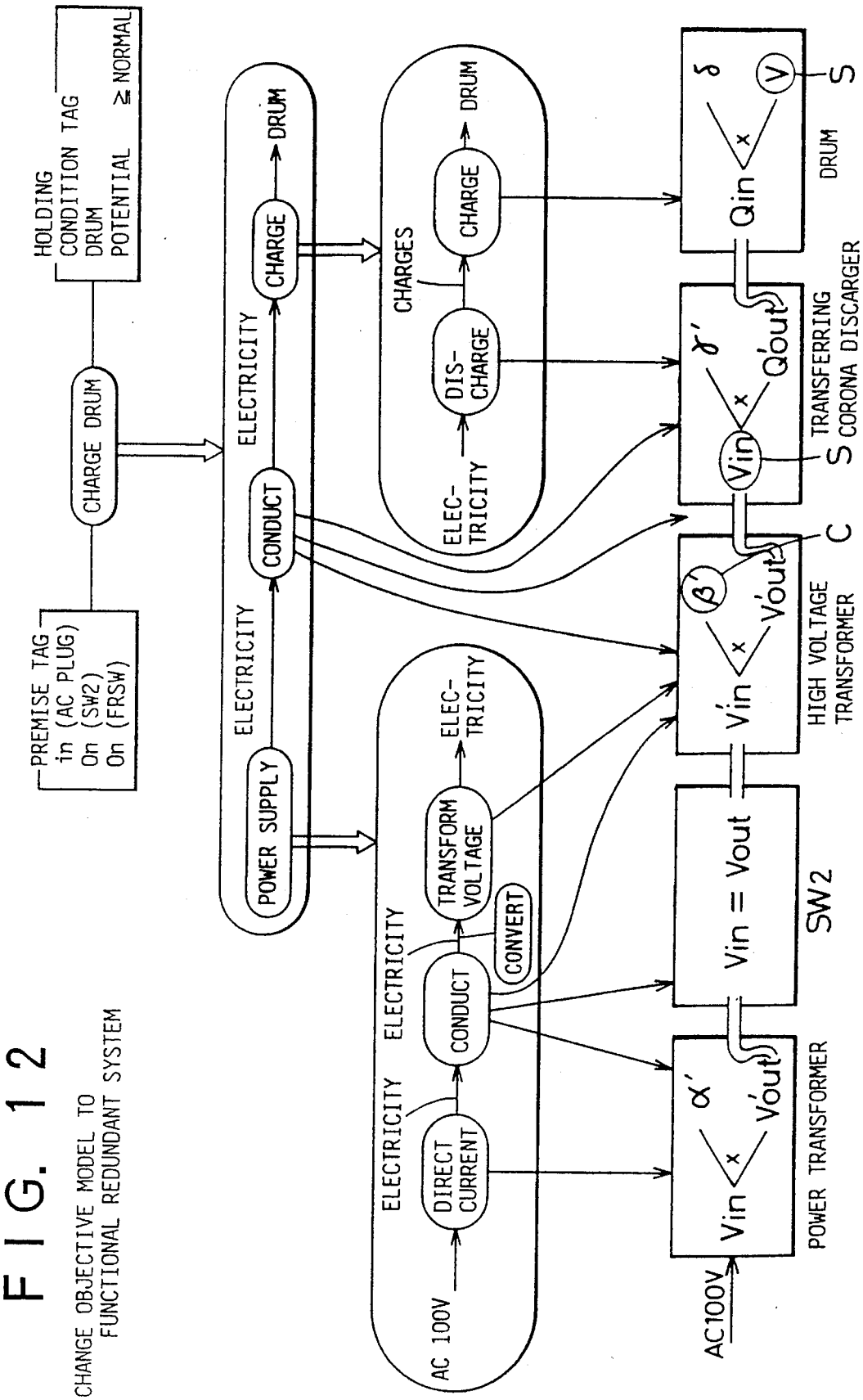
FIG. 12 is a diagram showing an FBS model in a case where a transferring corona discharger is used for a functional redundancy system.

A control sequence program is automatically created on the basis of the FBS model shown in FIG. 12, the function knowledge and the behavior knowledge.

Figure 13:
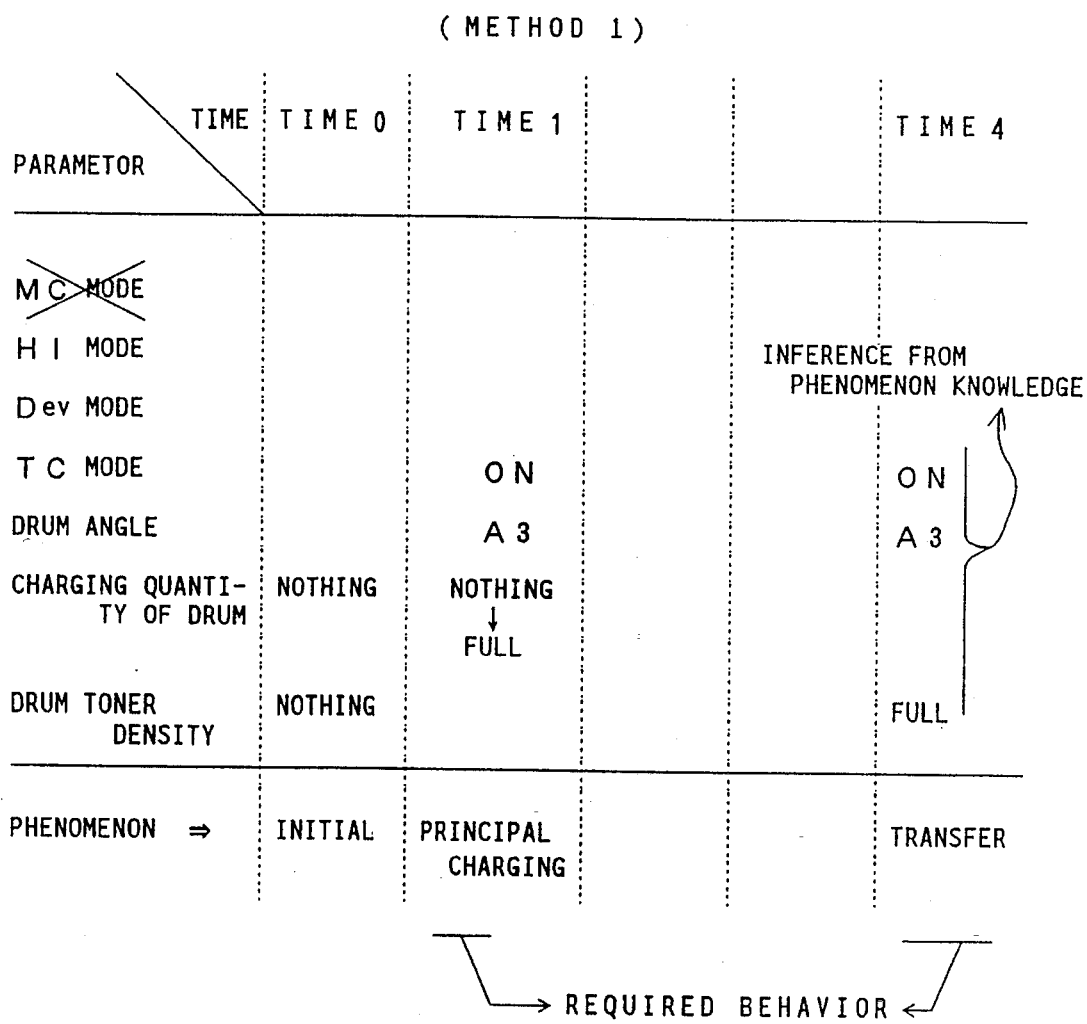
FIG. 13 is a diagram for explaining a method of creating a qualitative sequence for developing a redundant function.
Figure 14:
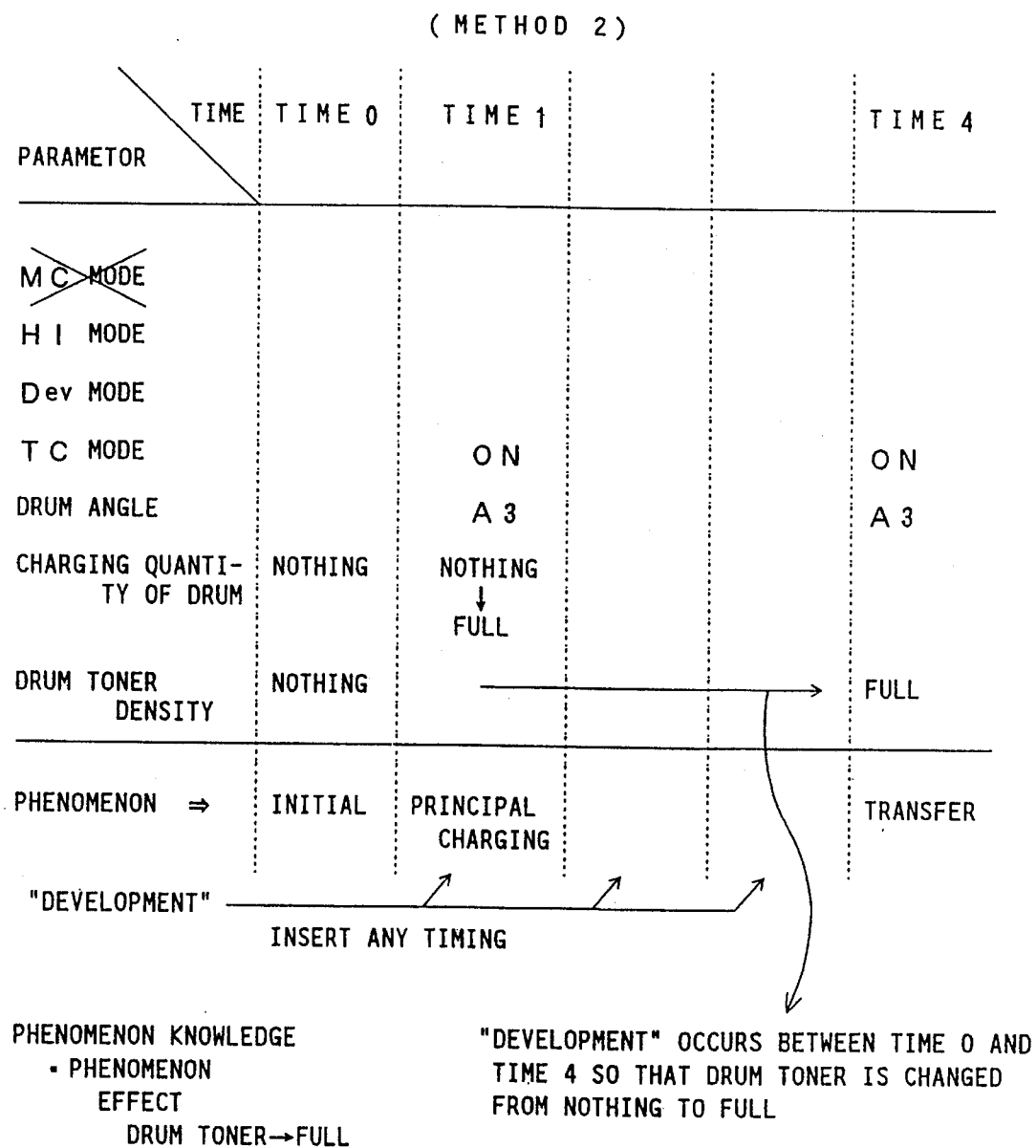
FIG. 14 is a diagram for explaining a method of creating a qualitative sequence for developing a redundant function.

Specifically, "principal charge→ transfer" is derived as a required behavior, and parameter values and the like for each instant in the required behavior are derived from a network of the dependent relation between phenomena shown in FIG. 14, as shown in FIG. 13. For example, in order to charge the drum by the transferring corona discharger 36, the following knowledge is derived by retrieving the premise conditions of all the phenomena which may occur shown in FIG. 14.

Conditions: transfer charge mode=ON
drum angle=A3
Effect: drum charge=nothing→Full Similarly, in order to transfer an image by the transferring corona discharger 36, the following knowledge is required.

Conditions: transfer charge mode=ON
drum angle=A3
drum toner=Full

Accordingly, a timing chart shown in FIG. 13 is produced.

A phenomenon which must occur between instantaneous states before and behind is then derived. As shown in FIG. 14, the drum toner is "nothing" at the time 0, and the drum toner is "Full" at the time 4. Therefore, it can be presumed that "development" must occur as a phenomenon between the time 0 and the time 4.

As shown in FIG. 15, therefore, a timing chart shown in FIG. 15 can be produced on the basis of the premise conditions and the effect required for a development phenomenon:

Conditions: development mode=ON
drum angle=A2
drum charge=Exposed
Effect: drum toner=nothing→Full In such a manner, inference is repeated until the required behavior is satisfied to fill the discontinuity of all the parameters. As a result, a qualitative timing chart at the time of the occurrence of a fault in the main charger 33 shown in FIG. 16 is completed.

Figure 17:
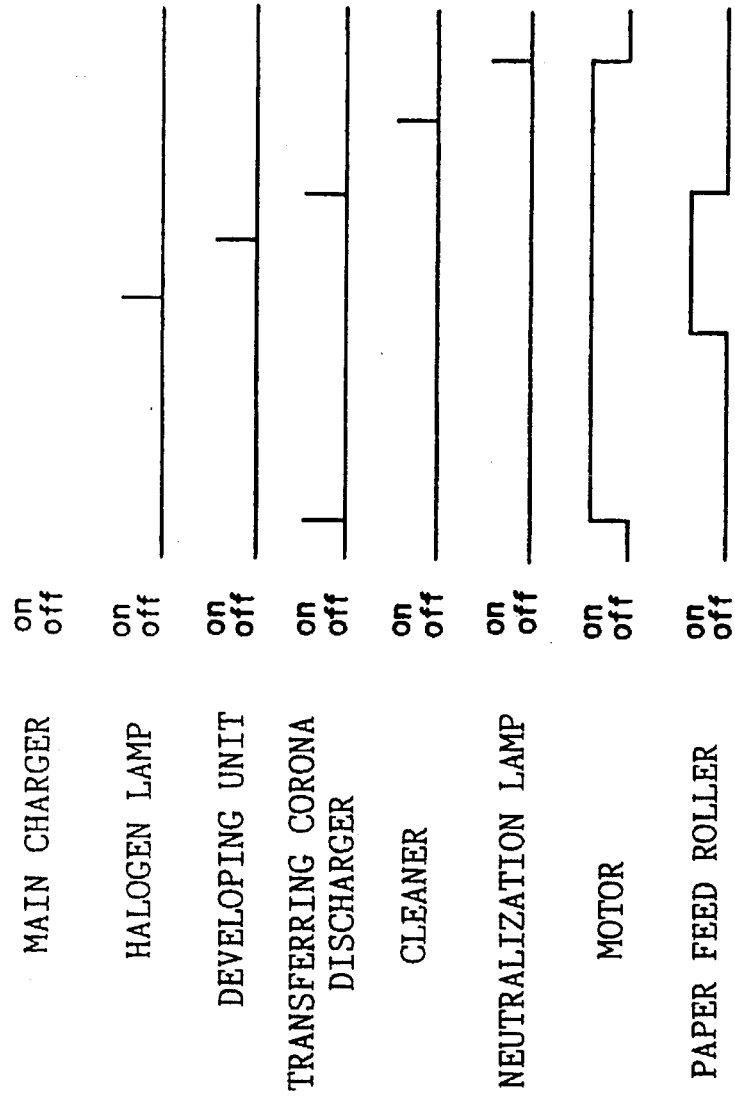
FIG. 17 is a diagram showing an example of a qualitative control sequence at the time of developing a redundant function.

An example of a qualitative control sequence created from the qualitative timing chart is shown in FIG. 17.

The timing chart shown in FIG. 16, that is, a parameter transition map is qualitative, and includes no quantitative value. Accordingly, quantitative information is added to the parameter transition map. The addition of the quantitative information is determined by reading information such as the diameter R, the rotation speed V, and the drum angles A0, A1, A2 and A3 of the photosensitive drum 31 from the design information database (DIDB) 5 shown in FIG. 1 and calculating the information.

The additional control sequence program for realizing functional redundancy created in the foregoing manner can be also widely applied to the other image forming apparatuses by storing the program in, for example, a ROM.

Furthermore, according to the present invention, when not only the image forming apparatus but also the machine system is controlled by the computer, it is possible to automatically create control sequence software required for the computer for control.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of automatically creating control sequence software for a computer that controls a machine system that has a machine portion, said method comprising the steps of:

storing design information data representative of the machine portion of the machine system;

storing knowledge data concerning functions of the machine system and knowledge concerning behaviors thereof;

representing the machine system by function, behavior and state model data (FBS model data) by an FBS representation which gives the relationship among functions, behaviors, states, and qualitative parameters of the machine system;

deriving derived state transition matrix data on the basis of time sequence relationships between said functions and said behaviors and said states contained in said FBS representation;

finding conditions of said qualitative parameters by qualitative inference on the basis of said knowledge data concerning said functions and said knowledge data concerning said behaviors so as to make said derived state transition matrix data physically noncontradictory;

adding a behavior or a state required to satisfy found conditions of said qualitative parameters to correct said noncontradictory state transition matrix data to provide corrected state transition matrix data;

determining determined times between a respective states in said corrected state transition matrix represented by said corrected state transition matrix data on the basis of said design information; and generating a generated quantitative control sequence from said corrected state transition matrix data and said determined times.

2. The method of automatically creating control sequence software according to claim 1, further comprising the steps of converting said generated quantitative control sequence into a predetermined programming language.

3. The method of automatically creating control sequence software according to claim 1, wherein said design information data of the machine portion includes attribute values of parts constituting an objective machine, structure information, and information on sensors and actuators.

4. The method of automatically creating control sequence software according to claim 1, wherein said FBS diagram includes data representative of: (a) phenomena which are desired to occur at a minimum in a certain state, (b) instantaneous states of parameter values, and (c) time relationships between said instantaneous states.

5. An apparatus for automatically creating control sequence software for a computer that controls a machine system that has a machine portion, said apparatus comprising:

knowledge storing means storing knowledge concerning functions of the machine system and knowledge concerning behaviors thereof;

design information storing means storing design information of the machine portion of the machine system;

inputting means for inputting function, behavior, and state (FBS) model data whereby the machine system is represented by an FBS diagram determining relationships among functions, behaviors and states and qualitative parameters;

qualitative control sequence deriving means for deriving a derived state transition matrix based on time sequence relationships between functions included in said inputted FBS model data and said behaviors and said states;

qualitative inference means for finding conditions of said qualitative parameters, by qualitative inference while referring to said knowledge concerning said functions and said knowledge concerning said behaviors stored in said knowledge storing means, which conditions would make said derived state transition matrix physically noncontradictory;

correcting means for correcting said derived state transition matrix to provide a corrected state transition matrix that satisfies conditions of said qualitative parameters found by said qualitative inference means; and quantitative control sequence deriving means for determining time between said states in said corrected state transition matrix and adding time data to said corrected state transition matrix to derive a quantitative control sequence on the basis of said design information stored in said design information storing means.

6. The apparatus for automatically creating control sequence software according to claim 5, further comprising programming language generating means for converting said quantitative control sequence derived by said quantitative control sequence deriving means into a desired programming language.

7. The method of automatically creating control sequence software according to claim 1, wherein said step of determining determined times includes the step of representing a certain transition between said respective states by a differential equation between certain of said qualitative parameters.

8. The method of automatically creating control sequence software according to claim 7, wherein said step of determining determined times further includes the steps of recognizing that said certain parameters do not change between said certain transition between said respective states, and wherein said step of representing said certain transition between said respective states according to said differential equation includes the step of using a relation $\Delta t = \Delta \alpha / \beta$ where $\alpha$ and $\beta$ are said certain qualitative parameters as said differential equation and calculating transition time between said respective states by said relation to provide said determined time.

9. The apparatus for automatically creating control sequence software according to claim 5, wherein said quantitative control sequence deriving means represents a certain transition between states in said transition matrix by a differential equation, $d\alpha/dt = \beta$ where $\alpha$ and $\beta$ are qualitative parameters from among said qualitative parameters.

10. The apparatus for automatically creating control sequence software according to claim 9, wherein for state transitions wherein said qualitative parameters do not change, said quantitative control sequence deriving means determines said time between said states according to $\Delta t = \Delta \alpha / \beta$.

* * * * *